United States Patent
Park et al.

(10) Patent No.: US 6,582,850 B2
(45) Date of Patent: Jun. 24, 2003

(54) ORGANIC-INORGANIC COMPOSITE AS A CATHODE MATERIAL FOR A SECONDARY LITHIUM BATTERY AND METHOD FOR MANUFACTURING THE SAME

(75) Inventors: Nam-Gyu Park, Taejon (KR); Kwang-Man Kim, Taejon (KR); Kwang-Sun Ryu, Taejon (KR); Yong-Joon Park, Seoul (KR); Soon-Ho Chang, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 164 days.

(21) Appl. No.: 09/773,018

(22) Filed: Jan. 31, 2001

(65) Prior Publication Data

US 2002/0110737 A1 Aug. 15, 2002

(30) Foreign Application Priority Data

Dec. 14, 2000 (KR) ......................... 2000-76646

(51) Int. Cl.[7] ........................... H01M 4/60; H01M 4/48
(52) U.S. Cl. ........................ 429/213; 429/231
(58) Field of Search ................. 429/212, 213, 429/217, 231.5

(56) References Cited

U.S. PATENT DOCUMENTS

| | | | |
|---|---|---|---|
| 5,571,292 A | * 11/1996 | Sotomura et al. | 429/213 X |
| 5,665,492 A | * 9/1997 | Sotomura | 429/213 |
| 5,723,230 A | * 3/1998 | Naoi et al. | 429/213 X |
| 6,340,539 B1 | * 1/2002 | Yamaguchi et al. | 429/213 |

OTHER PUBLICATIONS

M. Lira–Cantú and P. Gómez–Romero; *The Organic–Inorganic Polyaniline/V$_2$O$_5$ System*; Journal of The Electrochemical Society, 146(6), pp. 2029–2033; (1999). (Month Unknown).

Eiichi Shouji and Daniel A. Buttry; *New Organic–Inorganic Nanocomposite Materials for Energy Storage Applications*; Langmuir 1999, 15, pp. 669–673; Nov. 17, 1998.

N. Oyama, et al,; *Dimercaptan–polyaniline Composite Electrodes for Lithium Batteries with High Energy Density*; Nature vol. 373, No. 6515, pp. 598–600; Feb. 16, 1995.

J.H. Harreld, et al.; *Design and Synthesis of Inorganic–organic Hybrid Microstructures*; International Journal of Inorganic Materials (1999) pp. 135–146. (Month Unknown).

C.G.Wu, et al.; *Redox Intercalative Polymerization of Aniline in V$_2$O$_5$ Xerogel. The Postintercalative intralamellar Polymer Growth in Polyaniline/Metal Oxide Nanocomposites Is Facilitated by Molecular Oxygen*; Chem. Mater. 1996, pp. 1992–2004. (Month Unknown).

Bruno Alonso, et al.; *Synthesis of Vanadium Oxide Gels from Peroxovanadic Acid Solutions: A $^{51}$V NMR Study*; Journal of Solid State Chemistry 148, pp. 16–19; Mar. 16, 1999.

Lei Yu, et al.; *The Electrochemical Reversibility of the Polyaniline/Organodisulfide Composite Cathode Containing an Organomonothiol*; Journal of the Electrochemical Society, 146(9), pp. 3230–3233 (1999); Apr. 26, 1999.

* cited by examiner

Primary Examiner—Stephen Kalafut

(57) ABSTRACT

The present invention provides a new organic-inorganic (PDMcT+PANI)/V$_2$O$_5$ composites electrode material in which two different organic polymers are intercalated into the V$_2$O$_5$ interlayer, which shows higher discharge capacity than each isolated polymers and V$_2$O$_5$. Therefore, it can be used as a cathode in secondary lithium battery.

4 Claims, 5 Drawing Sheets

(a): V$_2$O$_5$ xerogel
(b): (PDMcT)/V$_2$O$_5$
(c): (PDMcT+PANI)/V$_2$O$_5$
(d): (PANI)/V$_2$O$_5$ (a): V$_2$O$_5$ xerogel
(b): (PDMcT)/V$_2$O$_5$
(c): (PDMcT+PANI)/V$_2$O$_5$
(d): (PANI)/V$_2$O$_5$ (A): (PDMcT)/$V_2O_5$
(B): (PDMcT+PANI)/$V_2O_5$ ORGANIC-INORGANIC COMPOSITE AS A CATHODE MATERIAL FOR A SECONDARY LITHIUM BATTERY AND METHOD FOR MANUFACTURING THE SAME

FIELD OF THE INVENTION

The present invention relates to an organic-inorganic composite as a cathode material for a secondary lithium battery and a method for manufacturing the same, and, more particularly, to an organic-inorganic composite as a cathode material for a secondary lithium battery in which two different organic polymers are stabilized between $V_2O_5$ layers by intercalation and a method for manufacturing the same.

PRIOR ART OF THE INVENTION

A secondary lithium battery is an energy storage device being capable of charging and discharging, which is widely used as a power source of small and/or portable electrical devices such as cellular phone, laptop computer and mobile telecommunication. Recently, development of the secondary battery that is lighter and has higher charge/discharge capacity is one of major issues. Secondary lithium battery comprises a cathode, an electrolyte and a negative electrode, in which charge/discharge characteristic of cathode material is one of most important factors to determine the capacity for energy storage in secondary lithium battery.

As for the cathode materials in secondary lithium battery, crystalline cobalt-, manganese- and nickel-based oxides are the most studied materials. Commercialized $LiCoO_2$ has high reduction-oxidation potential along with long term stability, but it has disadvantages of high cost and low charge/discharge capacity. In case of $Li_2Mn_2O_4$, it has been considered as an alternative to conventional $LiCoO_2$ because of low cost, but it has still problem in terms of charge/discharge capacity and long term stability. For the case of $LiNiO_2$, although it is better in theoretical discharge capacity than $LiCoO_2$ it has a difficulty in preparation. Therefore, there is a demand for a new electrode material to overcome the shortcomings of the crystalline transition metal oxides as described above.

Recent trends in the field of portable electrical devices for telecommunications are also on going to reduce power consumption, which requires a relatively low working voltage together with high energy density. To meet this end, the secondary battery with high charge/discharge capacity is required. Therefore, an attempt of synthesizing amorphous type, nano-particle and organic-inorganic compounds has been made to improve charge/discharge capacity.

Xerogel and/or aerogel type $V_2O_5$ is proved to be a good material for cathode in secondary lithium battery, much better in lithium insertion/extraction performance than crystalline phase, by Smyrl group of Minnesota University. In particular, the two dimensional structure of $V_2O_5$ allows organic molecules or ions to be intercalated into the $V_2O_5$ layers. Recently, improved discharge capacity for electrochemical lithium insertion has been observed for the oxygen post-treated polyaniline (PANI)-intercalated $V_2O_5$ nanocomposites, which is disclosed by Nazar group in Canada and Gomez-Romero group in Spain ("An organic-inorganic polyaniline/$V_2O_5$ system", The Journal of Electrochemical Society, vol. 146, no. 6, pp2029–2033, 1999.

In addition to the metal oxide-based electrode materials, organic materials can be utilized as a cathode in secondary lithium battery. An example is the 2,5-dimercapto-1,3,4-thiadiazole (DMcT)/PANI composite that demonstrates high discharge capacity of 185 mAh/g, which is reported by Oyama group in Japan ("dimercapto-polyaniline composite electrode for a lithium battery of high energy density", Nature, vol. 373, no. 6515, p598–800, 1995).

SUMMARY OF THE INVENTION

Therefore, it is an object of the present invention to provide a composite material for a cathode in secondary lithium battery with excellent charge/discharge characteristics and a method for manufacturing the same.

In accordance with an aspect of the present invention, there is provided an organic-inorganic composite for use as a cathode in a secondary lithium battery comprising a $V_2O_5$ xerogel in which poly(2,5-dimercapto-1,3,4-thiadiazole) (PDMcT) and polyaniline are co-intercalated, where the nominal composition of $V_2O_5$, xerogel:PDMcT:PANI is preferably 1:0.2–1:0.2–2 in mole %.

In accordance with another aspect of the present invention, there is provided a method for manufacturing an organic-inorganic composite for use as a cathode in a secondary lithium battery, the method comprises the fllowing steps of: (a) preparing $V_2O_5$ xerogel powder; (b) dissolving the $V_2O_5$ xerogel powder in distilled water to form $V_2O_5$-water solution; (c) dissolving DMcT molecule in organic solvent to form DMcT solution; (d) adding slowly the $V_2O_5$-water solution to the DMcT solution; (e) adding aniline to the resultant of (d); (f) reacting the resultant of (e) for 24 hours at a room temperature and then filtering and washing; and (g) drying the resultant of (f), where drying temperature at the step (g) is ranging from the room temperature to 80° C.

And, in accordance with still another aspect of the present invention, there is provided the manufacturing method after the step (g), further comprising the step of undergoing thermal treatment in an oxygen gas atmosphere, where the temperature and the heating time is 80 to 120° C. and 3 to 10 hours, respectively.

BRIEF DESCRIPTION OF THE DRAWINGS

The above and other objects and features of the instant invention will become apparent from the following description of preferred embodiments taken in conjunction with the accompanying drawings, in which.

PREFERRED EMBODIMENT OF THE INVENTION

Hybridization of inorganic $V_2O_5$ with organic compounds such as polyaniline, polypyrrole, polythiophene, and poly- DMcT has been already reported, but there has never been discussed on the hybrid system of two different polymers-intercalated $V_2O_5$.

The inventors suggest in this invention that a new organic-inorganic (PDMcT+PANI)/$V_2O_5$ composite shows better discharge capacity than both isolated organic polymer and $V_2O_5$. A new $V_2O_5$-based organic-inorganic composite compound that has two different organic polymers of PDMcT and PANI is invented and its electrochemical lithium ion insertion/extraction characteristics is investigated.

Hereinafter, preferred embodiments of the present invention and measurement results will be described in detail with reference to the accompanying drawings.

Embodiments (1) Preparation of $V_2O_5$ Xerogel-Water Solution

To prepare $V_2O_5$ xerogel, 3 g of crystalline $V_2O_5$ is dissolved in 300 ml of 10% hydrogen peroxide solution, which is aged for three days in air. Powder form of red $V_2O_5$ xerogel is obtained by drying in an electric oven at 100° C. Aqueous $V_2O_5$ xerogel solution is obtained by dissolving 0.5 g of the powder (2.34 mmol) in 20–30 ml of distilled water.

(2) Preparation of (PDMcT)/$V_2O_5$ Compound

For intercalation of DMcT into $V_2O_5$, a solution of 0.17 g (1.17 mmol) DMcT dissolved in 240 ml of MeOH is slowly added to a 2.34 mole of $V_2O_5$ obtained at (1). A green solution appeared immediately. The reaction mixture is kept at room temperature in air with constant stirring for 24 h. The powder is filtered and washed with MeOH, followed by drying under vacuum.

(3) Preparation of (PDMcT+PANI)/$V_2O_5$ Compound

A 0.17 g (1.17 mmol) of DMcT is dissolved in 240 ml of MeOH. To this is added a 2.34 mmol of dried $V_2O_5$ xerogel solution obtained at (1). The mixture is stirred at room temperature for 1 h, followed by adding a 0.22 g (2.34 mmol) of aniline. The reaction mixture is stirred at room temperature for 24 h in air. The product is isolated by filtration, washed with MeOH until the yellow color of the filtrate disappeared. The green powder is dried under vacuum.

(4) Preparation of (PANI)/$V_2O_5$ Compound

Intercalation of polyaniline into $V_2O_5$ is performed by reacting $V_2O_5$ xerogel with aniline in a MeOH/$H_2O$ (80:20 wt %) solution. a 2.34 mmol of dried $V_2O_5$ xerogel solution obtained at (1) is added to a 0.22 g (2.34 mmol) of aniline solution dissolved in 240 ml of MeOH. The reaction mixture is stirred at room temperature for 24 h. The black powder obtained was washed with MeOH, followed by drying under vacuum.

(5) Post-Oxygen Treatment

The resultants obtained in (1) trough (4) are dried under vacuum and then heated for 3–10 hours at 80–120° C. under oxygen gas atmosphere.

FTIR Measurements

Figure 1:
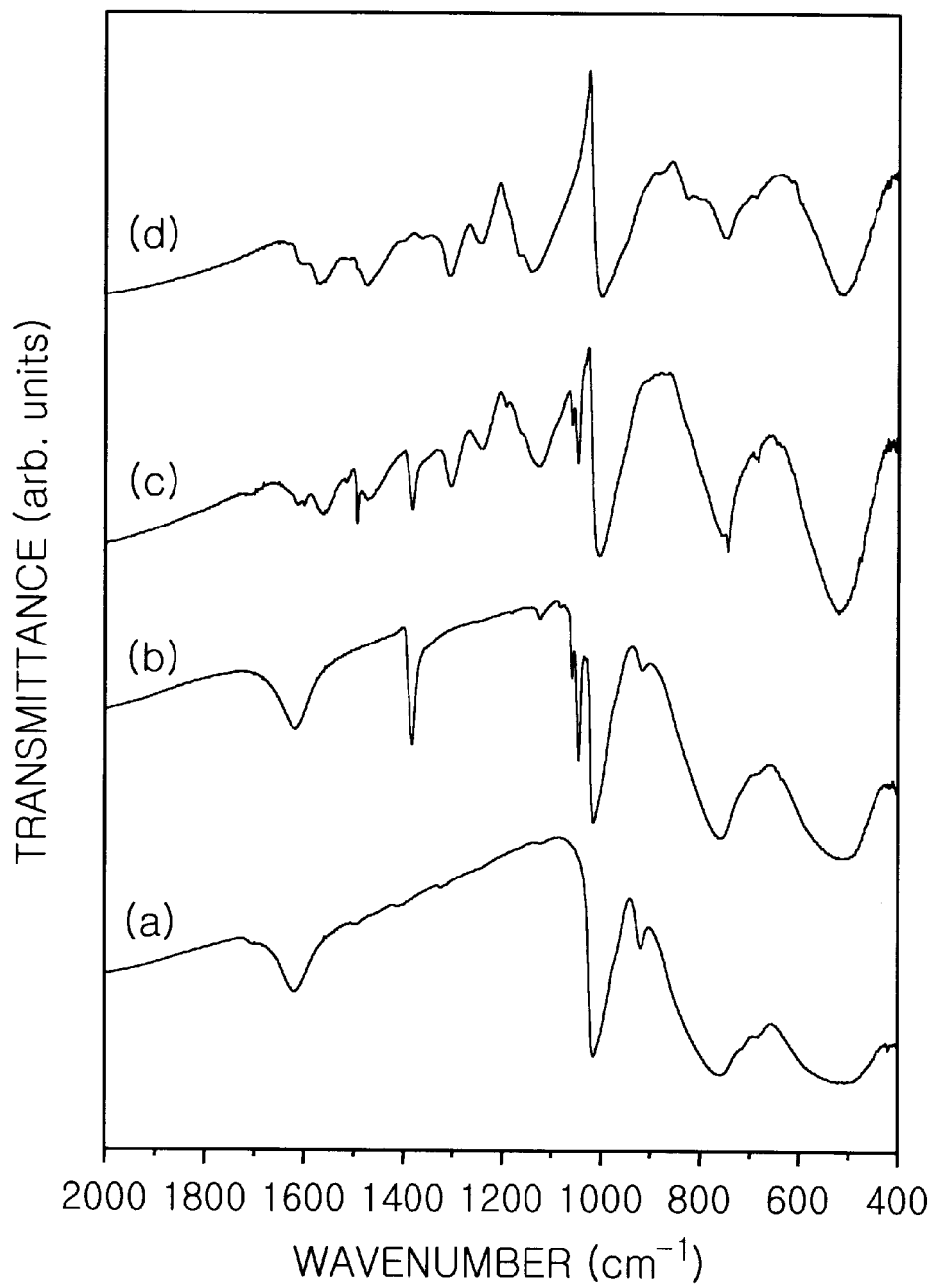
FIG. 1 shows FTIR spectra of $V_2O_5$ xerogel, (PDMcT)/$V_2O_5$, (PDMcT+PANI)/$V_2O_5$ and (PANI)/$V_2O_5$.

Referring to FIG. 1, there are provided measurement result for Fourier transformed infrared spectra of each compound prepared as described above.

In FIG. 1, spectrum (a) is for the dried $V_2O_5$ xerogel, spectrum (b) is for (PDMcT)/$V_2O_5$ compound obtained in the embodiment (2), spectrum (c) is for (PDMcT+PANI)/$V_2O_5$ compound prepared in the embodiment (3), and spectrum (d) is for (PANI)/$V_2O_5$ compound prepared in the embodiment (4). Three peaks lower than 1000 $cm^{-1}$ in the spectrum (a) correspond to the typical vibration bands between V and O, and two peaks around 1050 and 1380 $cm^{-1}$ in the spectrum (b) are characteristics of polymerized PDMcT. In the spectrum (c), it shows clearly PDMcT and PANI, which indicates the polymerized PDMcT and polyaniline are co-existed in the $V_2O_5$ layer when DMcT and aniline are reacted together.

X-ray Diffraction (XRD) Measurements

Figure 2:
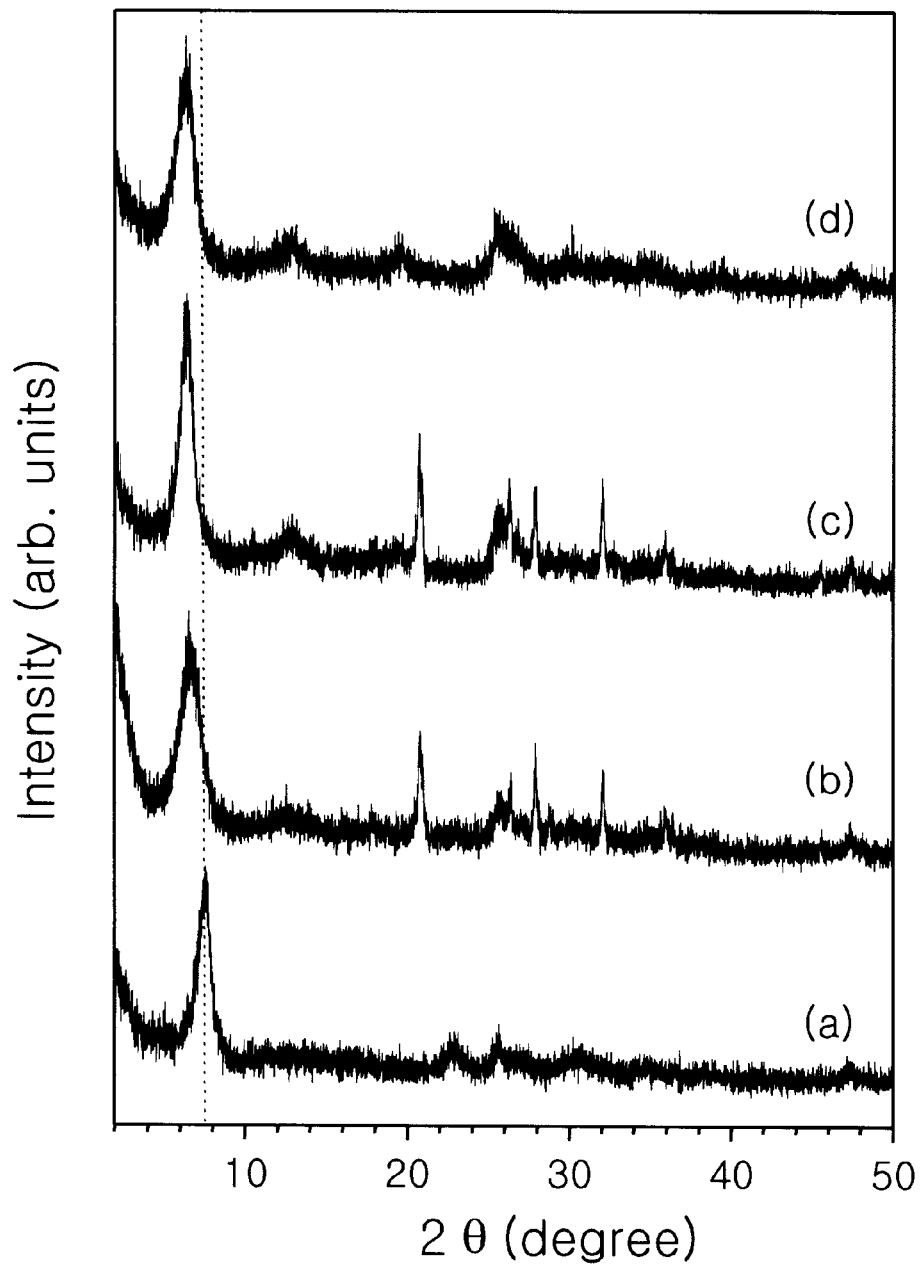
FIG. 2 shows X-ray diffraction spectra of $V_2O_5$ xerogel, (PDMcT)/$V_2O_5$, (PDMcT+PANI)/$V_2O_5$ and (PANI)/$V_2O_5$.

Referring to FIG. 2, there are provided measurement result for XRD spectra of each compound prepared as described above. Compounds for each spectrum (a) through (d) in FIG. 2 are identical to those in FIG. 1.

XRD analysis confirms the intercalation of organic polymers into the interlayer of $V_2O_5$ xerogel from the lower angle-shifted (001) reflections upon intercalation. Lattice expansion from 11.79 Å to 13.83 Å is observed for all the organic polymer-intercalated samples. This interlayer expansion of about 2 Å is as a consequence of removing one layer of $H_2O$ (approximately 2.8 Å) and inserting one monolayer of PDMcT and/or PANI. The net lattice expansion can thus be calculated to be 4.8 Å, which suggests that parallel polymer chains lie between the $V_2O_5$ slabs. Therefore, in the case of the (PDMcT+PANI)/$V_2O_5$ system, each monolayer of PDMcT and PANI is formed in the interlamellar space of $V_2O_5$.

Discharge Characteristics of As-Prepared Samples

A Swagelok™-type cell is assembled in the dry room for electrochemical measurements. The mixture of the synthesized organic/$V_2O_5$ material, the Super P black (MMM Carbon Co.) and the polytetrafluoroethylene (70:20:10 wt %) is used as a cathode, Li foil as a negative electrode and 0.95 M solution of $LiPF_6$ in ethylene carbonate/dimethyl carbonate (50:50 vol %) as an electrolyte.

Figure 3:
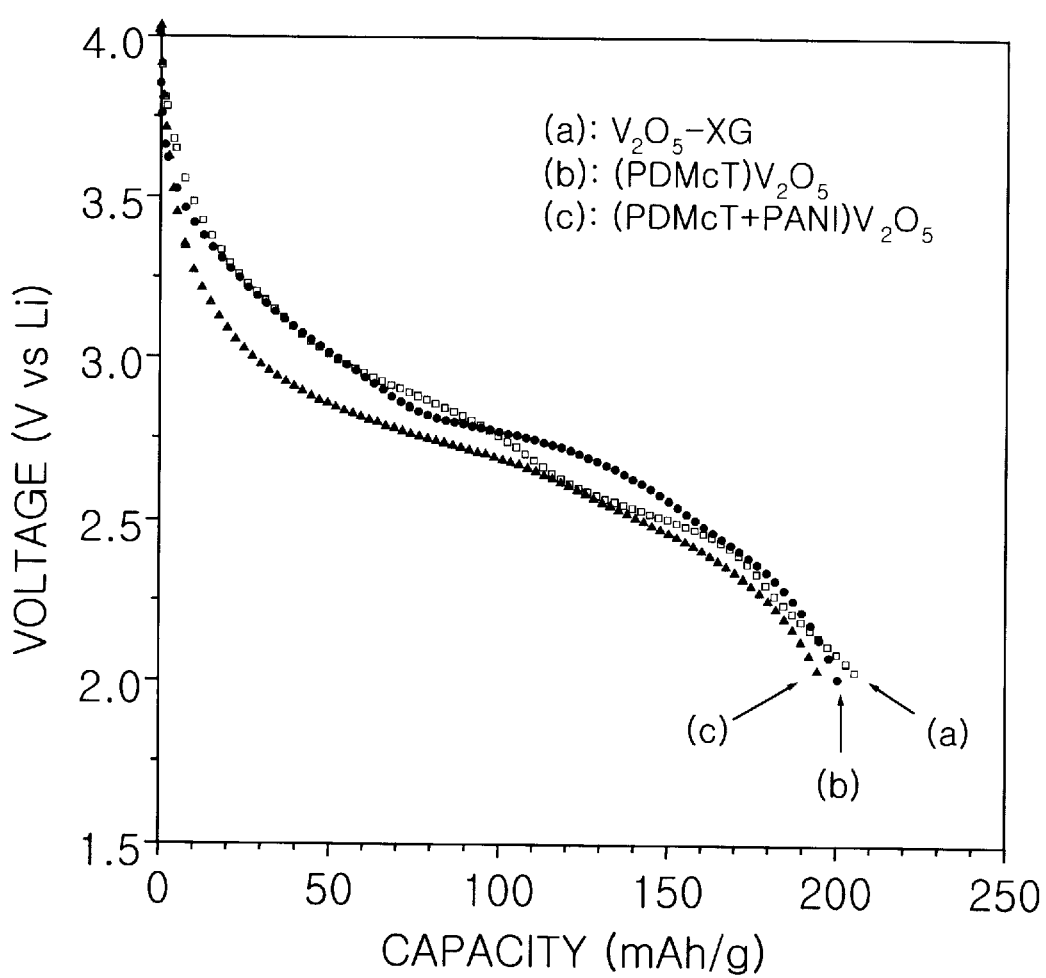
FIG. 3 shows the first discharge capacity of the as-prepared $V_2O_5$ xerogel, (PDMcT)/$V_2O_5$ and (PDMcT+PANI)/$V_2O_5$ under a constant current density of 0.5 mA/cm$^2$.

FIG. 3 shows the first discharge curves measured at 0.5 mA/$cm^2$ in the range of 2–4 volts for the as-prepared $V_2O_5$ xerogel, (PDMcT)/$V_2O_5$ and (PDMcT+PANI)/$V_2O_5$. Discharge capacity of organic-inorganic hybrid materials is slightly lower than that of the pristine $V_2O_5$. This means that the intercalated polymer is not activated for the lithium ion insertion.

Comparison of Discharge Capacity for the as-Prepared Samples and Post-Oxygen Treated Samples A Swagelok™-type test cell is prepared by the same procedue as described above.

Figure 4A:
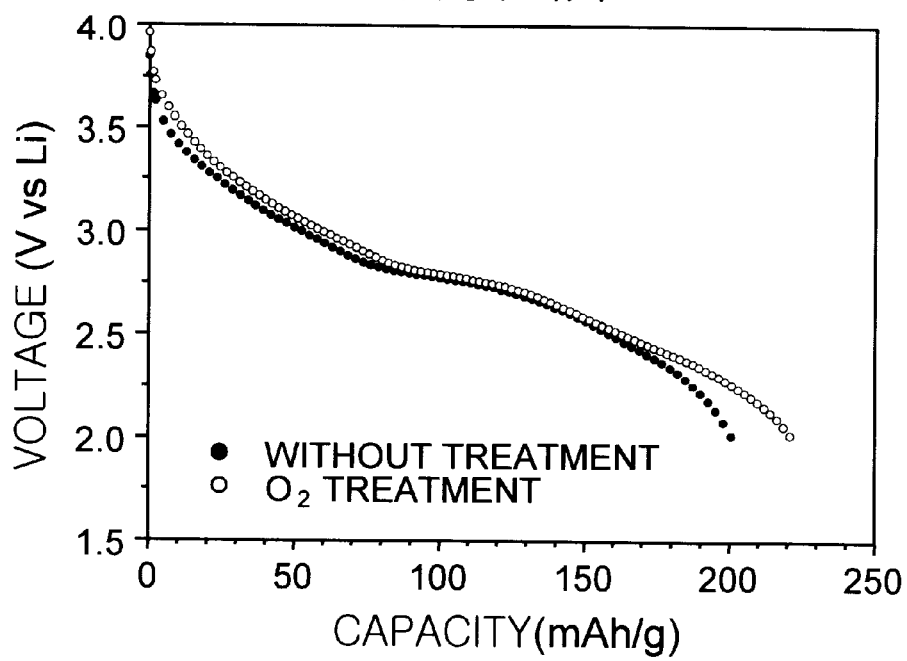
FIG. 4A compares the first discharge capacity of (PDMcT)/$V_2O_5$ before and after oxygen treatment under a current density of 0.5 mA/cm$^2$.
Figure 4B:
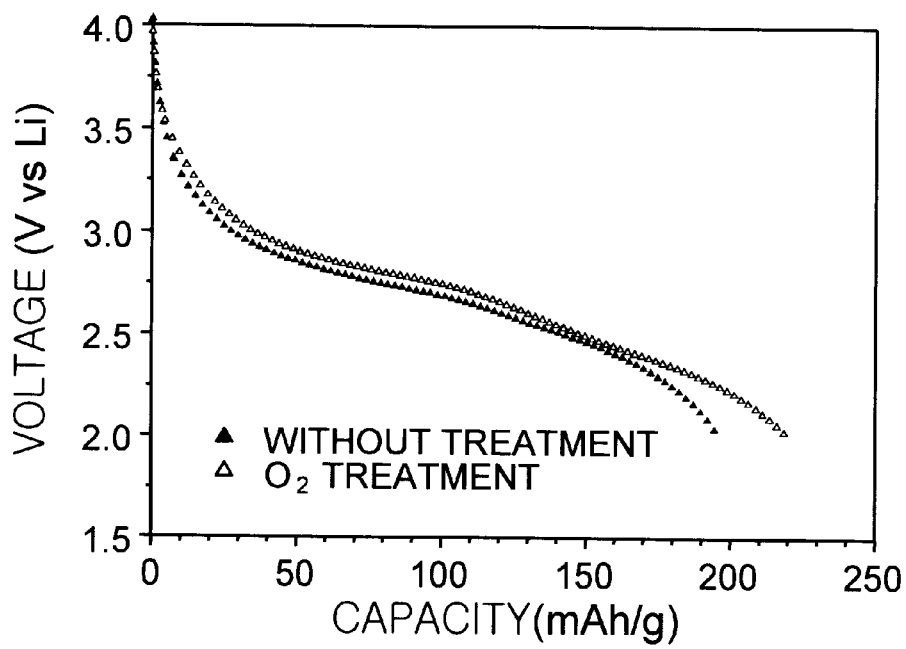
FIG. 4B compares the first discharge capacity of (PDMcT+PANI)/$V_2O_5$ before and after oxygen treatment under a current density of 0.5 mA/cm$^2$.

In FIG. 4, (A) compares the discharge profile of (PDMcT)/$V_2O_5$ compound before and after oxygen treatment, in which the discharge capacity of (PDMcT)/$V_2O_5$ compound is increased after the oxygen treatment. And, in FIG. 4, (B) represents the discharge characteristics of (PDMcT+PANI)/$V_2O_5$ compound before and after oxygen treatment, where a similar effect is observed as in case of (PDMcT)/$V_2O_5$. This means that the post-oxygen treatment activates the intercalated polymers as an electrochemical active species for lithium insertion.

Comparison of Cycling Performance

Figure 5:
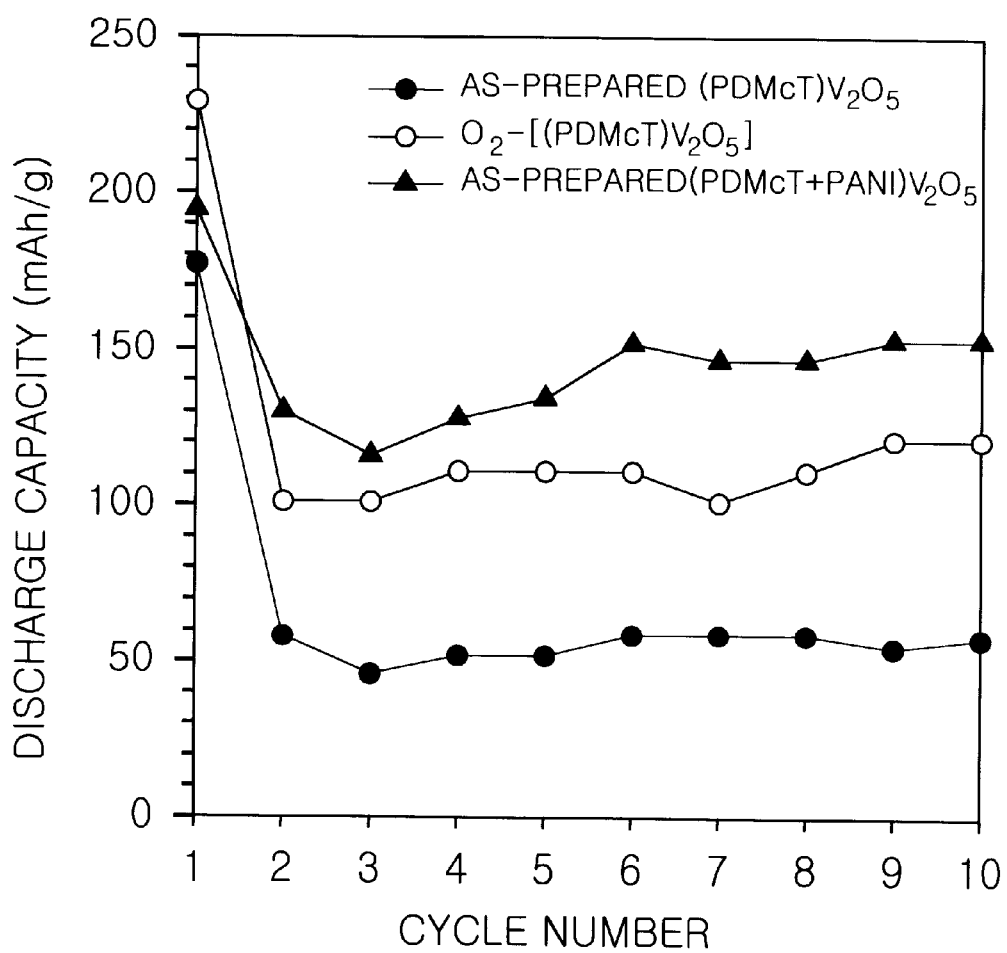
FIG. 5 shows the variation of discharge capacity with the number of cycles for the as-prepared (PDMcT)/$V_2O_5$, oxygen-treated (PDMcT)/$V_2O_5$ and as-prepared (PDMcT+PANI)/$V_2O_5$. Discharge and charge cycled under a constant current density of 0.5 mA/cm$^2$.

Variation of discharge capacity with respect to the number of cycles for each compound are depicted in FIG. 5. The as-prepared (PDMcT)/$V_2O_5$ sample exhibits a large loss in discharge capacity after first cycle but maintains the capacity after that. As mentioned above, this large capacity loss is due to electrochemical inactivity of PMcT in the as-prepared sample. The retention of discharge capacity is better for the oxygen-treated (PDMcT)/$V_2O_5$ than the as-prepared sample, which is attributed to an improved electrochemical reversibility of PDMcT by oxygen treatment. Compared to the cyclability of the oxygen-treated (PDMcT)/$V_2O_5$, the as-prepared (PDMcT+PANI)/$V_2O_5$ sample retains even better discharge capacity, which means the electrochemical reversibility of PDMcT is improved in the presence of PANI.

In table 1, the first discharge capacity of the compound is compared as changing the reaction composition. In table 1, x, y and z represent the nominal composition of DMcT, ANI and $V_2O_5$, respectively.

TABLE 1

| Reaction Composition (mol %) | First discharge capacity (MAh/g) | |
| --- | --- | --- |
| | Before oxygen treatment | After oxygen treatment |
| X:y:z = 0:0:1 | 205 | 209 |
| X:y:z = 0:5:0.1 | 199 | 221 |
| X:y:z = 1:0:1 | 179 | 249 |
| X:y:z = 0:5:1.1 | 195 | 220 |
| X:y:z = 1:1:1 | 171 | 209 |

As shown in table 1, little change in the discharge capacity of $V_2O_5$ is observed before and after oxygen treatment. However post-oxygen treated organic polymer-$V_2O_5$ hybrid materials are found to be significantly improved.

As described above, the new (PDMcT+PANI)/$V_2O_5$ composite electrode material shows better charge/discharge property, therefore, it can be used for high discharge capacity-required secondary lithium battery.

While the present invention has been shown and described with respect to the particular embodiments, it will be apparent to those skilled in the art that many changes and modifications may be made without departing from the spirit and scope of the invention as defined in the appended claims.

What is claimed is:

1. A method for manufacturing an organic-inorganic composite for use as a cathode of a secondary lithium battery, the method comprising the following steps of:

(a) manufacturing a $V_2O_5$ xerogel powder;

(b) dissolving the $V_2O_5$ xerogel powder in distilled water to form $V_2O_5$-water solution;

(c) dissolving DMcT molecule in organic solvent to form DMcT solution;

(d) adding the $V_2O_5$-water solution to the DMcT solution;

(e) adding aniline to the resultant of (d);

(f) reacting the resultant of (e) for 24 hours at a room temperature and then filtering and washing; and (g) drying the resultant of (f) under vacuum at temperature ranging from room temperature to 80° C.

2. The manufacturing method as recited in claim 1, after the step (g), further comprising the step of undergoing thermal processing in an oxygen atmosphere.

3. The manufacturing method as recited in claim 2, where the temperature ranges from 80 to 120° C. and time interval from 3 to 10 hours, respectively.

4. The manufacturing method as recited in claim 1, where the $V_2O_5$-water solution consists of 0.5 g dried powder $V_2O_5$ xerogel in 20–30 ml distilled water.

* * * * *